United States Patent
Kittaka et al.

[11] Patent Number: 6,078,431
[45] Date of Patent: Jun. 20, 2000

[54] OBJECT LENS SYSTEM

[75] Inventors: Shigeo Kittaka, Osaka; Koji Kakimoto; Hiroshi Koshi, both of Sagamihara, all of Japan

[73] Assignee: Nippon Sheet Glass Co., Ltd., Osaka, Japan

[21] Appl. No.: 09/264,491

[22] Filed: Mar. 8, 1999

[30] Foreign Application Priority Data

Mar. 9, 1998 [JP] Japan .................................. 10-074841

[51] Int. Cl.⁷ .............................. G02B 9/00; G02B 3/02
[52] U.S. Cl. ......................... 359/654; 359/652; 359/719
[58] Field of Search ................................. 359/642, 652, 359/654, 719

[56] References Cited

U.S. PATENT DOCUMENTS

| 4,647,159 | 3/1987 | Baba . | |
|---|---|---|---|
| 4,668,055 | 5/1987 | Nishi et al. | 350/432 |
| 4,684,221 | 8/1987 | Takada . | |

OTHER PUBLICATIONS

Nishi et al., "Gradient—index objective lens for the compact disk system", *Applied Optics,* vol. 25, No. 19, Oct. 1, 1986, pp. 3340–3345. XP002106460.

Ishikawa et al. "Marked low–loss coupling of laser diode to single mode fiber by a plan—convex graded—index rod lens", Internationa Conference on Integrated Optics and Optical FibreCommincation (IOOC) and European Conference on Optical Communication (ECOC), Venice, Oct. 1–4, 1985, vol. 1, No. conf. 5, 11, Oct. 1, 1985, pp. 637–640. XP000040185.

Handbooks for Microoptics, First Edition, first printing, Jun. 20, 1995, ISBN 4–254–21024–8, partial translation.

*Primary Examiner*—Georgia Epps
*Assistant Examiner*—David N. Spector
*Attorney, Agent, or Firm*—Merchant & Gould P.C.

[57] ABSTRACT

A rod lens made of a transparent cylindrical medium having a refractive index distribution in the radial direction is used as a graded index lens. An object surface and an image surface are arranged on both sides of the rod lens. A first surface of the lens is a convex spherical surface, and a second surface of the lens is a planar surface, and the lens is arranged so that the convex spherical surface faces the object surface, and the planar surface faces an image surface. The equations $$1.0 \leq R/r_0 \leq 1.6, \text{ and}$$

$$R/f \leq 1.2$$

are satisfied, wherein $r_0$ is a radius of a portion of the rod lens that operates as a lens, measured from an optical axis of the lens, R is a curvature radius of the convex spherical surface, and f is a focal length of the rod lens. Thus, an object lens system with a large NA, that is smaller and lighter, while keeping the number of parts to a minimum, can be provided.

8 Claims, 12 Drawing Sheets

OBJECT LENS SYSTEM

FIELD OF THE INVENTION

The present invention relates to an object lens system using a single lens with a refractive index distribution (also referred to as "graded index lens" in the following). More specifically, the present invention relates to an object lens system using a graded index lens having a convex spherical surface on one side and a planar surface on the other side. This optical system can be used, for example, for an object lens system of an optical head used for reading information stored on an optical disk and writing information onto the optical disk.

BACKGROUND OF THE INVENTION

In all kinds of optical disk systems, such as compact disk players or DVD players, optical heads irradiating laser light that is focused by an object lens onto a recording plane are used for reading information from recording media and writing information onto recording media. To increase the recording density of the recording medium, it is necessary to make the focus spot diameter of the object lens smaller, and therefore it is preferable that the image-side NA (numerical aperture) of the object lens is large. Furthermore, striving for a reduction of the reproduction and access times, it is important that the object lens is small and light.

Conventionally, aspherical plastic lenses with NA≈0.45 were used for the object lens in compact disk players, and aspherical molded glass lenses with NA≈0.60 were used for the object lens in DVD players. In any case, conventional object lenses have an outer diameter of several mm (typically, about 4 mm).

In order to achieve further miniaturization of recording devices using for example optical disks, the object lens itself has to be made even smaller. However, since aspherical lenses are press-formed using a die, it is very difficult to make miniature aspherical lenses with a diameter of 1 mm or less (see "Bishoukougaku Handobukku", p. 6, *Optical Society of Japan*, 1995).

Rod lenses having a refractive index distribution in the radial direction can be used as optical imaging systems with an outer diameter of 1 mm or less. The refractive index distribution for this kind of rod lenses can be expressed, for example, as $$n(r)^2 = n_0^2 \cdot \{1 - (g \cdot r)^2 + h_4(g \cdot r)^4 + h_6(g \cdot r)^6 + h_8(g \cdot r)^8 + \ldots\} \quad \text{(Eq. 1)}$$

wherein r is a distance in a radial direction from the optical axis of the rod lens; n(r) is the refractive index at a distance r in the radial direction from the optical axis of the rod lens; $n_0$ is a refractive index on the optical axis of the rod lens (central refractive index); and g, $h_4$, $h_6$, $h_8$, etc. are refractive index distribution coefficients.

Such a graded index lens can be manufactured, for example, from a rod-shaped glass by ion exchange (see for example "Hikarigijutsu Yougo Jiten" 2$^{nd}$ Ed., by Shuuji KOYANAGI, Optronics, Tokyo 1998, p. 12). Using ion exchange, a miniature lens with an outer diameter of not more than 1 mm can be manufactured at low cost. Furthermore, since the material itself has a positive refractive power, simple rod lenses having planar surfaces on both ends can be used as object lenses.

The refractive power of a rod lens having the refractive index distribution of Eq. 1 can be expressed by $n_0 \cdot g \cdot r_0$. The larger this value, the larger is the NA of the object lens. However, if a rod lens having a refractive index distribution in the radial direction is produced by ion exchange, there is a limit to the refractive index difference that can be attained, and a realizable range for $n_0 \cdot g \cdot r_0$ is $n_0 \cdot g \cdot r_0 \leq 0.71$.

However, to increase the recording density of recording media even further, there is a need for an object lens system with an even larger NA. Moreover, to achieve both a smaller device and faster access speeds, the number of parts has to be kept to a minimum, while making the object lens system smaller and lighter.

SUMMARY OF THE INVENTION

It is an object of the present invention to provide an object lens system with a large NA that is smaller and lighter, while the number of parts has been kept to a minimum.

To achieve this object, an object lens system in accordance with the present invention comprises a lens made of a transparent medium with a refractive index distribution in a radial direction. A first surface of the lens is a convex spherical surface, and a second surface of the lens is a planar surface. The lens is arranged so that the convex spherical surface faces an object plane, and the planar surface faces an image plane, and the equations $$1.0 \leq R/r_0 \leq 1.6, \text{ and} \quad \text{(Eq. 2)}$$

$$R/f \leq 1.2 \quad \text{(Eq. 3)}$$

are satisfied, wherein $r_0$ is a radius of a portion of the lens that operates as a lens, measured from an optical axis of the lens, R is a curvature radius of the convex spherical surface, and f is a focal length of the lens.

With this configuration of an object lens system, the refractive power of the entire lens is increased, and the image-side NA is increased. As a result, if the object lens system is used for an optical head, the recording density of the recording medium can be increased. Moreover, since the object lens system consists of a single graded index lens with a certain structure, a smaller and lighter object lens system can be achieved, while keeping the number of parts to a minimum and providing for higher access speeds.

It is preferable that the radius $r_0$ of the portion of the lens that operates as a lens, measured from the optical axis of the lens, is in a range of 0.05 mm $\leq r_0 \leq$ 0.20 mm. This configuration facilitates the manufacture of the graded index lens (especially, when the graded index lens is a rod lens) and the processing of the convex spherical surface, while the entire object lens system can be made smaller. Moreover, it is more preferable that the radius $r_0$ of the portion of the lens that operates as a lens, measured from the optical axis of the lens, is in a range of 0.10 mm $\leq r_0 \leq$ 0.15 mm, most preferably about 0.125 mm.

It is preferable that this object lens system is mounted in an optical head, in a manner that the convex spherical surface of the lens faces a light source, and the planar surface of the lens faces a recording medium. With this configuration, the NA on the side of the recording medium can be increased, and the recording density of the recording medium can be increased.

It is preferable that the lens is a rod lens, whose refractive index distribution is expressed by Eq. 1, i.e.

$$n(r)^2 = n_0^2 \cdot \{1 - (g \cdot r)^2 + h_4(g \cdot r)^4 + h_6(g \cdot r)^6 + h_8(g \cdot r)^8 + \ldots \quad \text{(Eq. 1)}$$

wherein r is a distance in a radial direction from the optical axis of the rod lens, $n_0$ is a refractive index on the optical axis of the rod lens, and g, $h_4$, $h_6$, $h_8$, etc. are refractive index distribution coefficients.

In this case, it is preferable that the refractive index $n_0$ on the optical axis of the rod lens is in a range of $1.40 \leq n_0 \leq 1.80$. This range for the refractive index $n_0$ is governed by the range which can actually be achieved for example with ion exchange. It is also preferable that a product $n_0 \cdot g \cdot r_0$ is in a range of $0.45 \leq n_0 \cdot g \cdot r_0 \leq 0.71$, where the refractive index on the optical axis of the rod lens 1 is $n_0$, the radius $r_0$ is the radius of the portion of the rod lens that operates as a lens, measured from the optical axis of the rod lens, and the coefficient g is a coefficient for the refractive index distribution. If $n_0 \cdot g \cdot r_0$ is less than 0.45, the NA cannot be increased (the lens cannot be made brighter) and if $n_0 \cdot g \cdot r_0$ exceeds 0.71, it is difficult to manufacture the rod lens for example by ion exchange. It is also preferable that the refractive index distribution coefficient $h_4$ is in a range of $-1.5 \leq h_4 \leq 2.5$. With this configuration, the spherical aberration of the entire object lens system can be suitably corrected. Moreover, it is also preferable that $L_2/r_0$ is in the range $L_2/r_0 \leq 0.37$, wherein $L_2$ is a distance between the planar surface of the lens and the image plane. With this configuration, the spherical aberration of the entire object lens system can be corrected easily. Furthermore, it is also preferable that $L_1/r_0$ is in the range $5 \leq L_1/r_0 \leq 20$, wherein $L_1$ is a distance between the object plane (light source in an optical disk system) and the convex spherical surface of the lens. Usually, an optical fiber with an NA of about 0.05 to 0.2 is used as a light source in an optical disk system, so that by using the object lens system for such a finite system the widening of the light from the light source can be matched with the diameter of the rod lens, and the loss of light energy can be kept low. Moreover, it is also preferable that the distance $L_1$ between the image plane and the convex spherical surface of the lens is infinite. Such an infinite system is useful when using a parallel light beam for the light source.

DESCRIPTION OF THE PREFERRED EMBODIMENTS

The following is a detailed description of the preferred embodiments of the present invention, with reference to the accompanying drawings.

Figure 1:
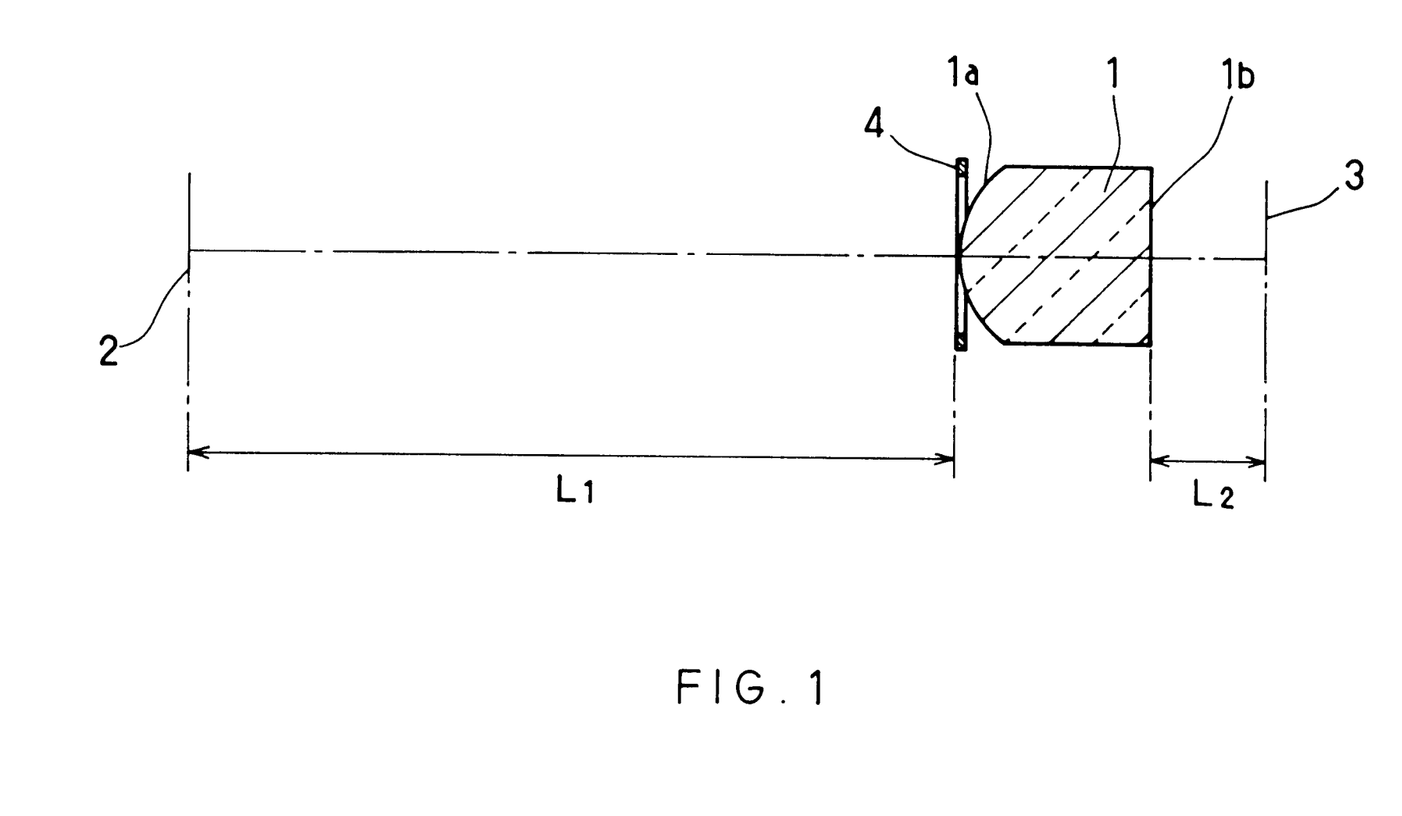
FIG. 1 is a cross-sectional diagram of an object lens system in accordance with the present invention.
Figure 2:
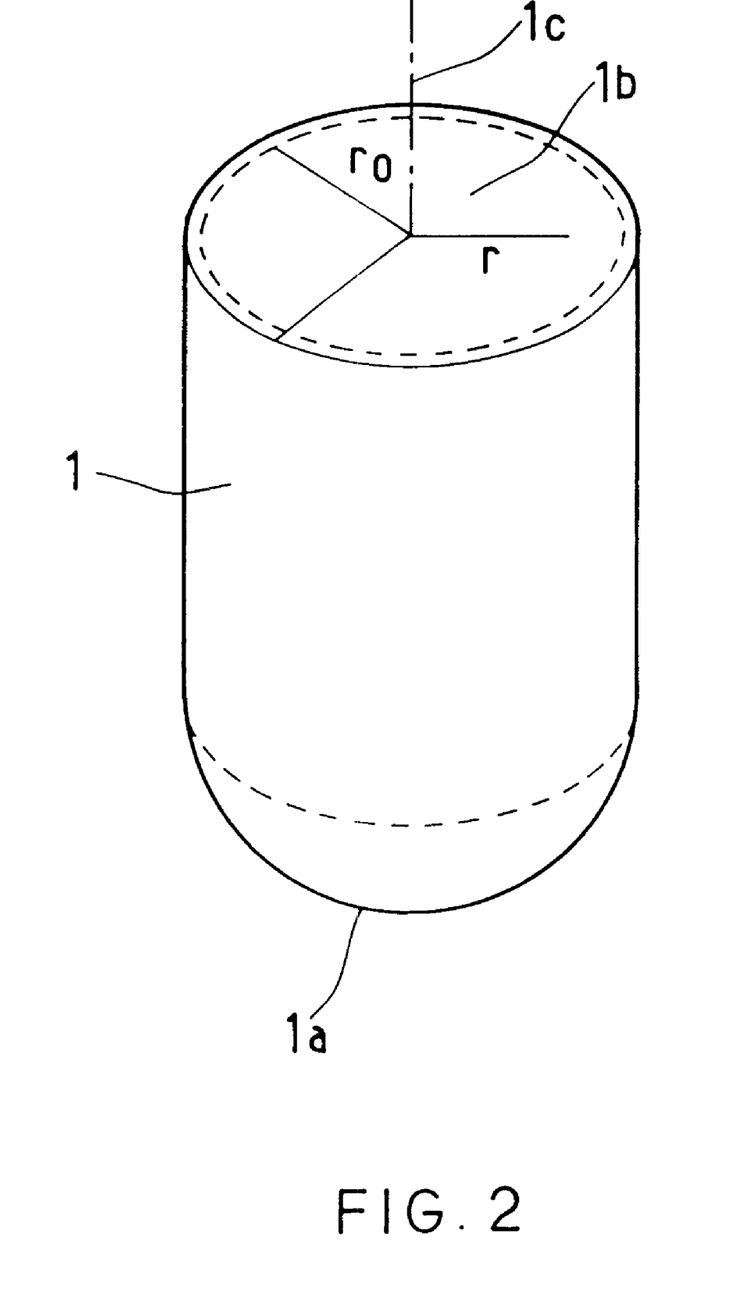
FIG. 2 is a perspective view of a rod lens used for an object lens system in accordance with the present invention.

In accordance with the present invention, an object lens system comprises (a) a rod lens 1 having a cylindrical transparent medium as shown in FIGS. 1 and 2, which has a refractive index distribution in the radial direction and is used as a graded index lens, and (b) an object plane 2 and an image plane 3 which are arranged on respective sides of the rod lens 1. The surface on one side of the rod lens 1 is a convex spherical surface 1a, and the surface on the other side is a planar surface 1b. The convex spherical surface 1a faces the object plane 2, and the planar surface 1b faces the image plane 3 of the rod lens 1. In FIG. 1, an aperture stop 4 is further provided at the vertex of the convex spherical surface 1a of the rod lens 1.

Figure 3:
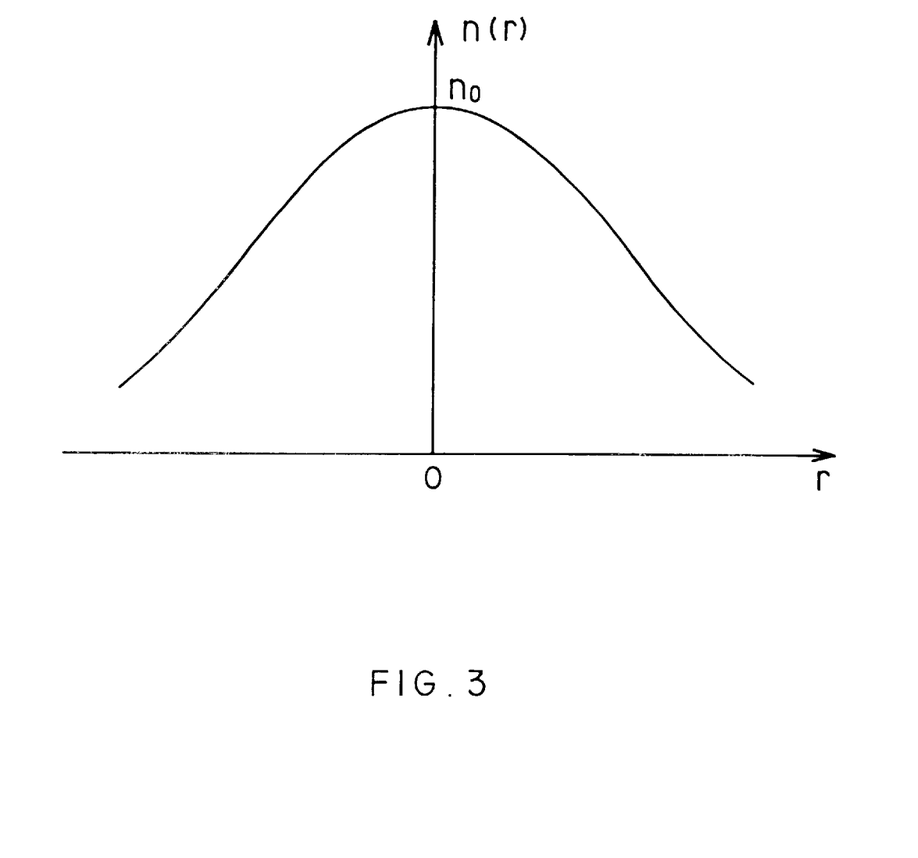
FIG. 3 is a graph of the refractive index distribution in a rod lens used for an object lens system in accordance with the present invention.
Figure 4:
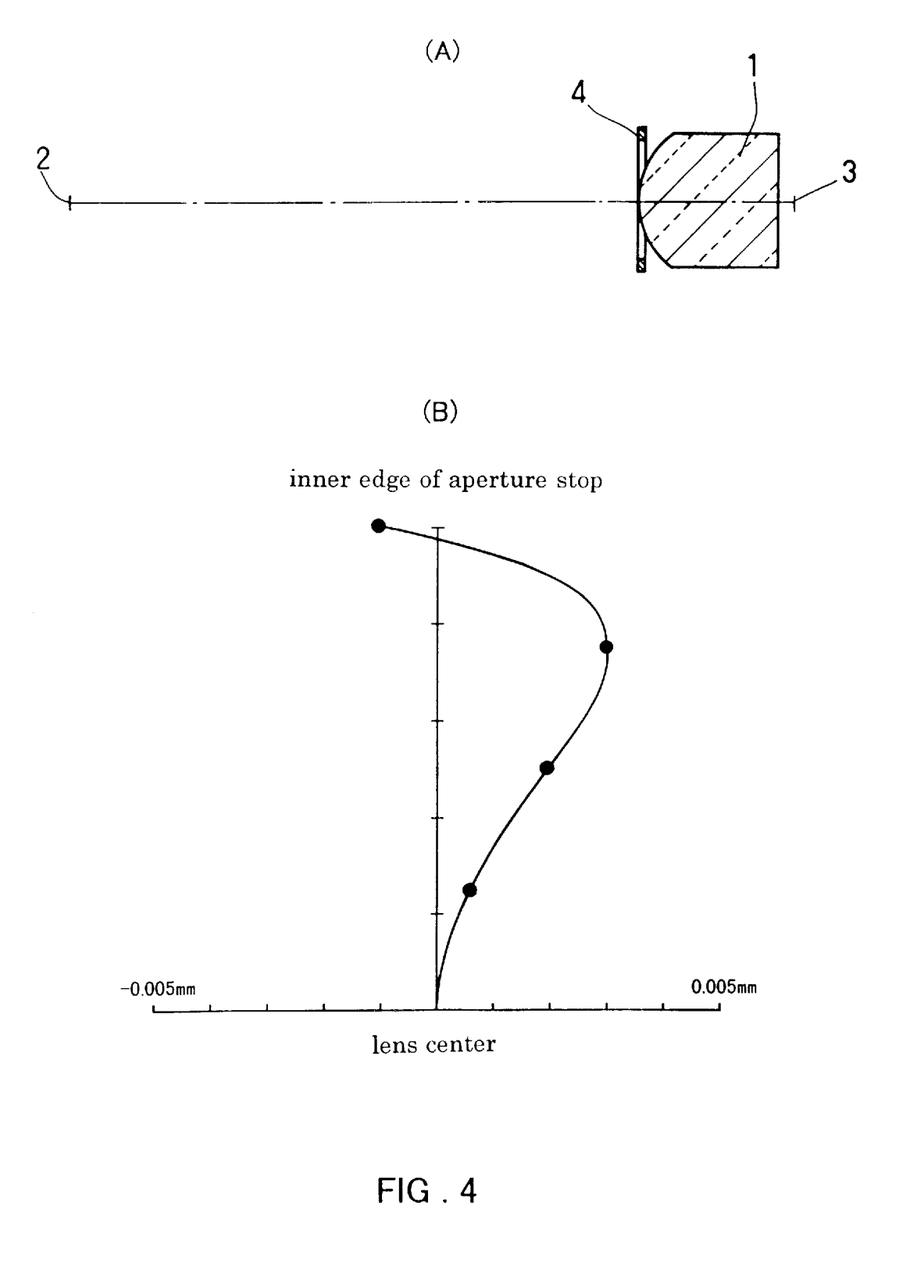
FIG. 4(A) is a cross-sectional diagram of Example 1 of an object lens system in accordance with the present invention.
FIG. 4(B) is a graph of the lateral spherical aberration of the object lens system in FIG. 4(A).
Figure 5:
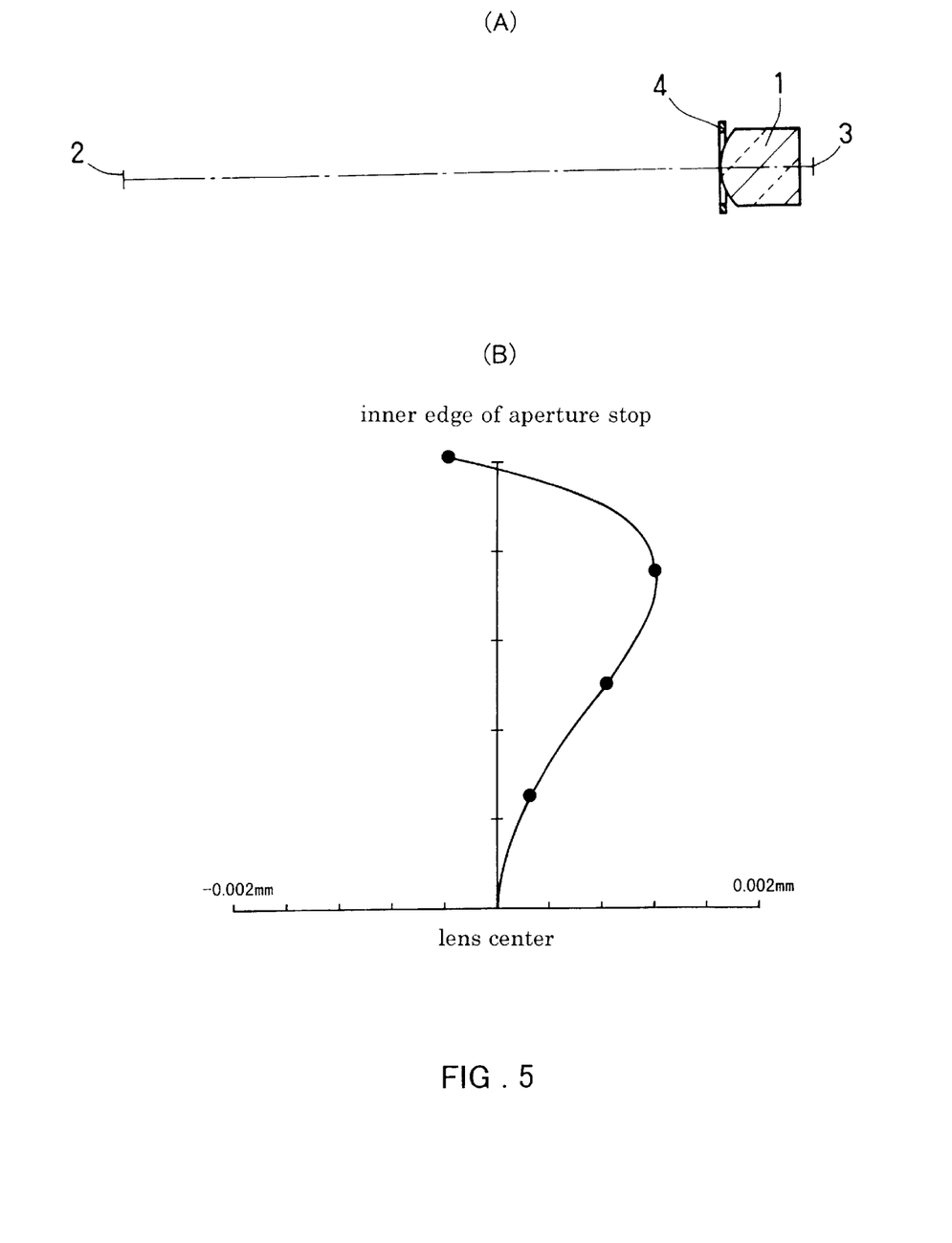
FIG. 5(A) is a cross-sectional diagram of Example 2 of an object lens system in accordance with the present invention.
FIG. 5(B) is a graph of the lateral spherical aberration of the object lens system in FIG. 5(A).
Figure 6:
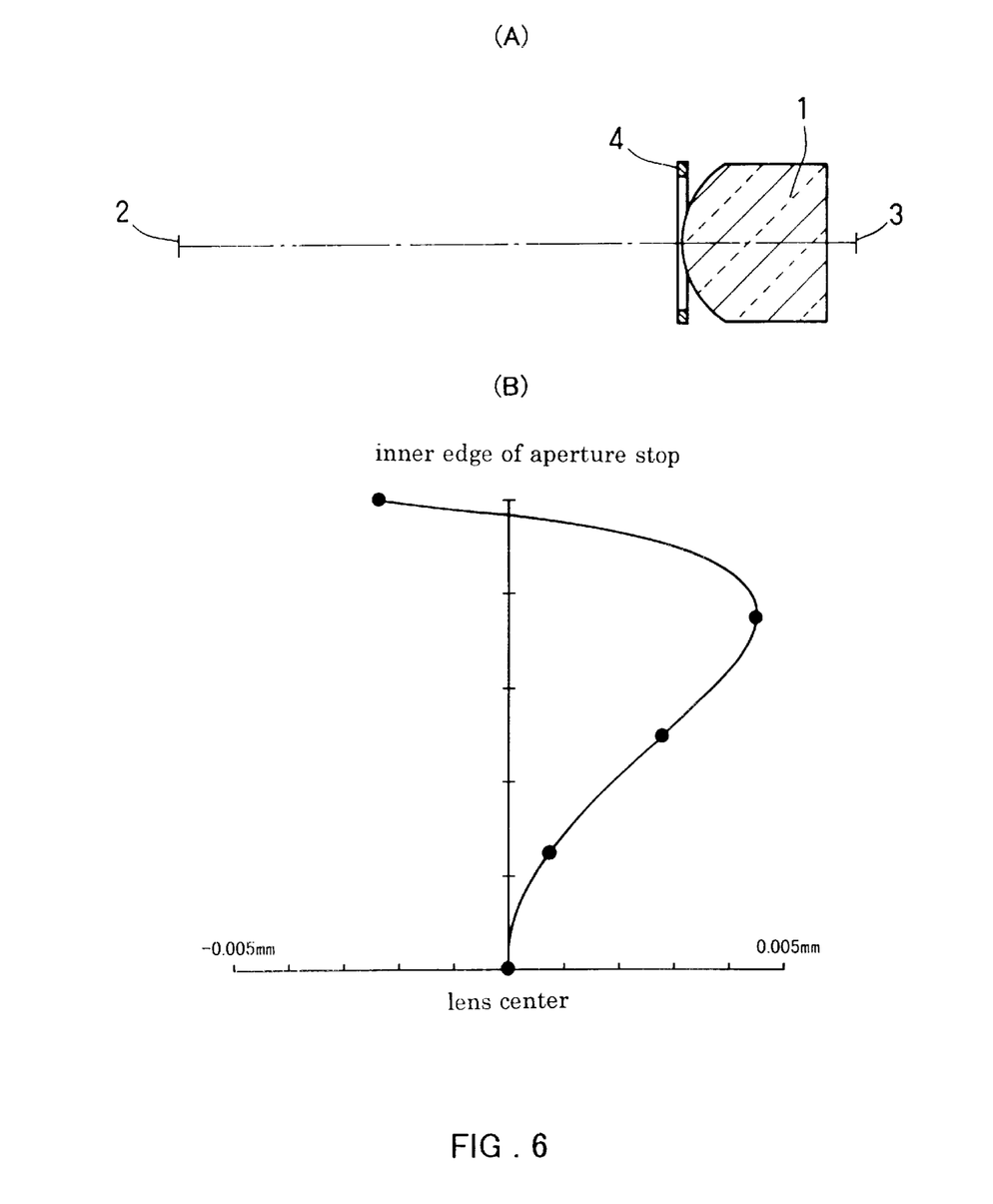
FIG. 6(A) is a cross-sectional diagram of Example 3 of an object lens system in accordance with the present invention.
FIG. 6(B) is a graph of the lateral spherical aberration of the object lens system in FIG. 6(A).
Figure 7:
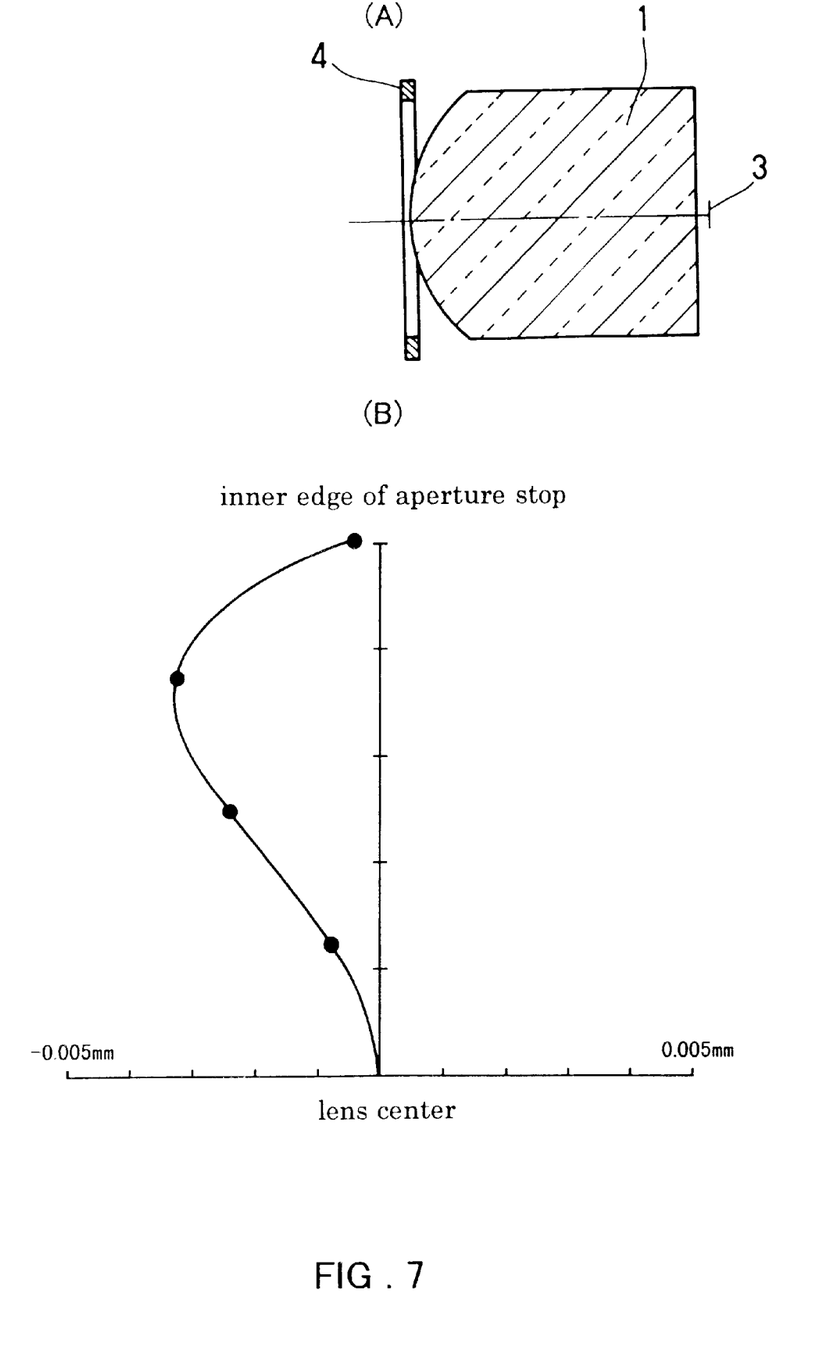
FIG. 7(A) is a cross-sectional diagram of Example 4 of an object lens system in accordance with the present invention.
FIG. 7(B) is a graph of the lateral spherical aberration of the object lens system in FIG. 7(A).
Figure 8:
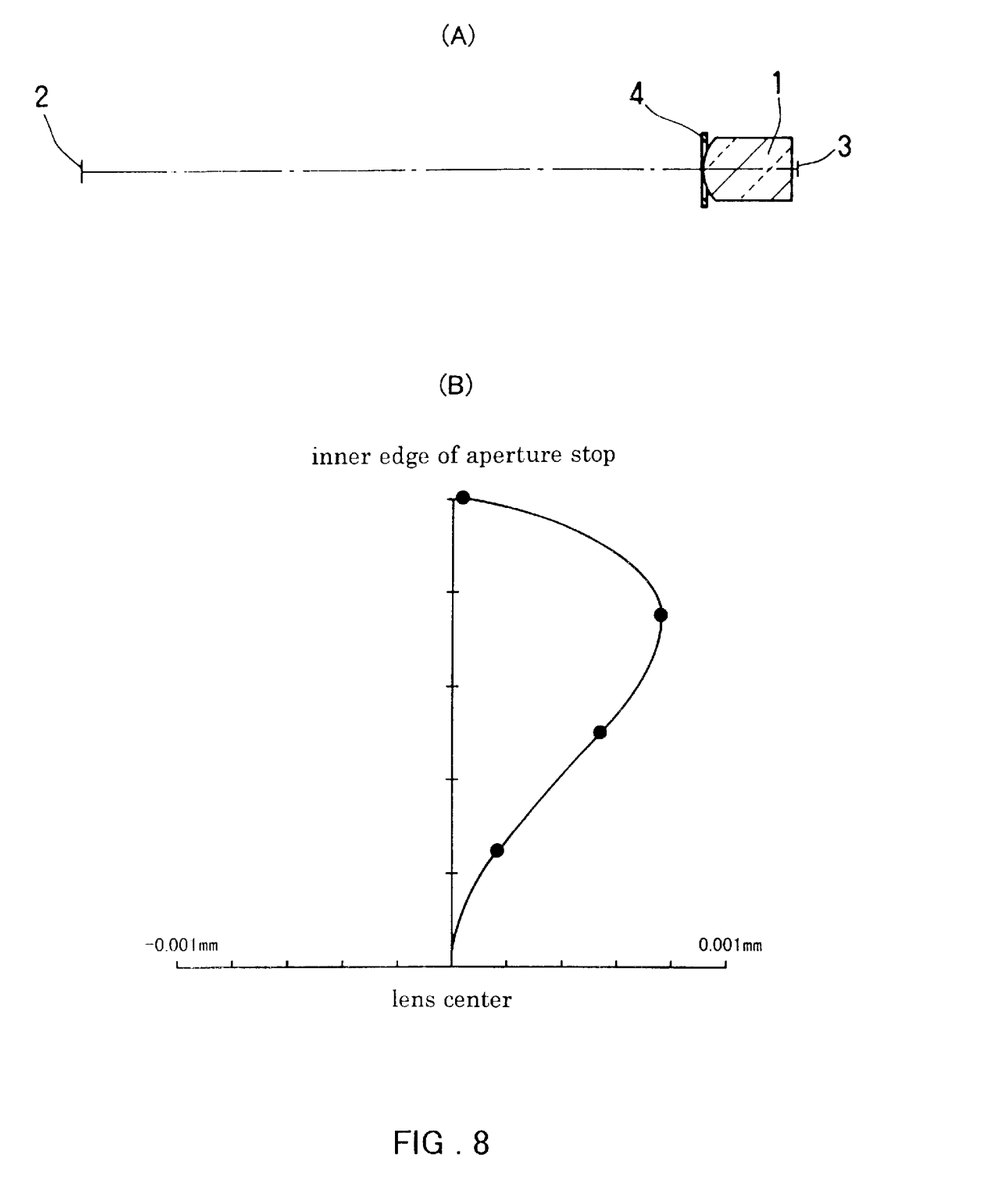
FIG. 8(A) is a cross-sectional diagram of Example 5 of an object lens system in accordance with the present invention.
FIG. 8(B) is a graph of the lateral spherical aberration of the object lens system in FIG. 8(A).
Figure 9:
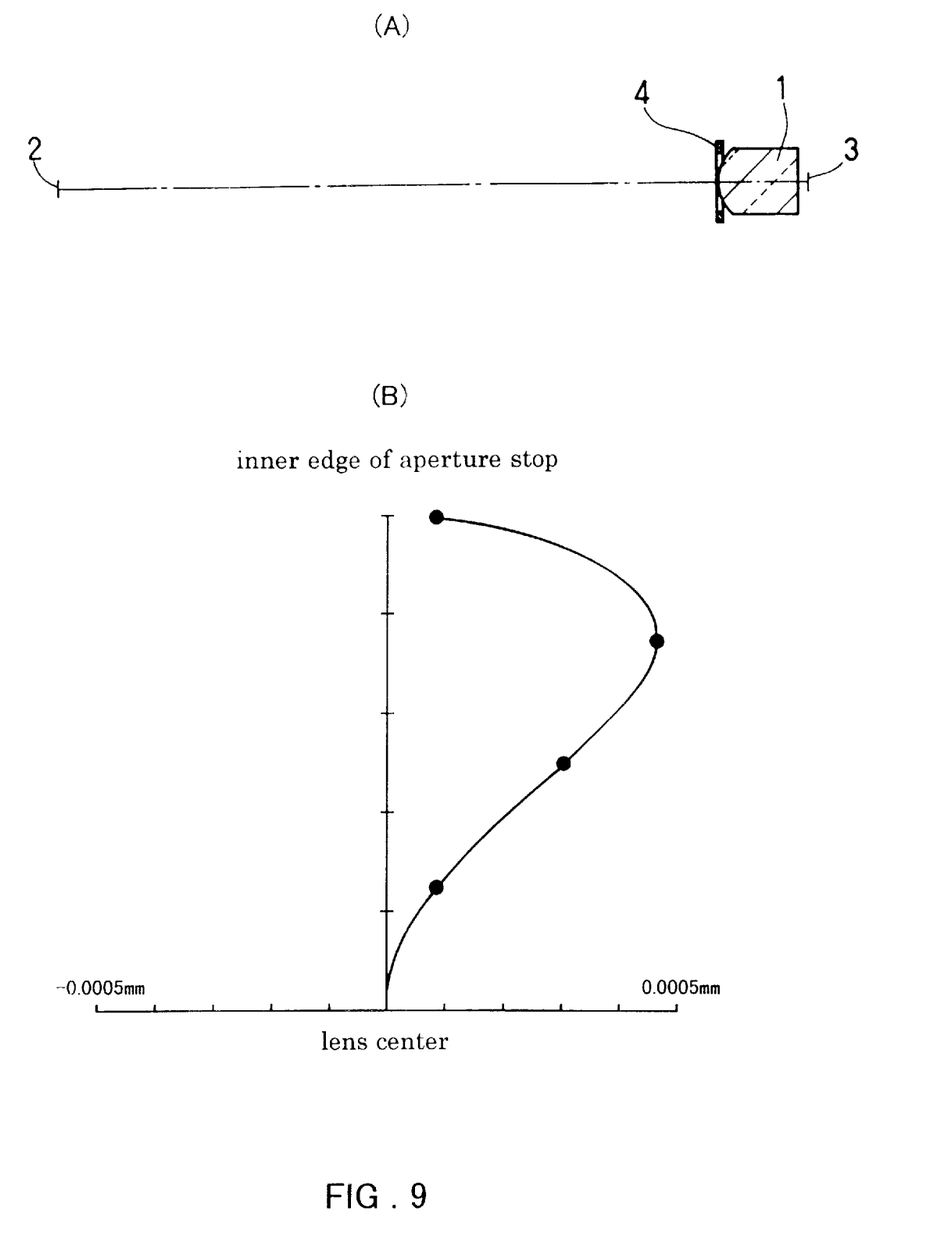
FIG. 9(A) is a cross-sectional diagram of Example 6 of an object lens system in accordance with the present invention.
FIG. 9(B) is a graph of the lateral spherical aberration of the object lens system in FIG. 9(A).
Figure 10:
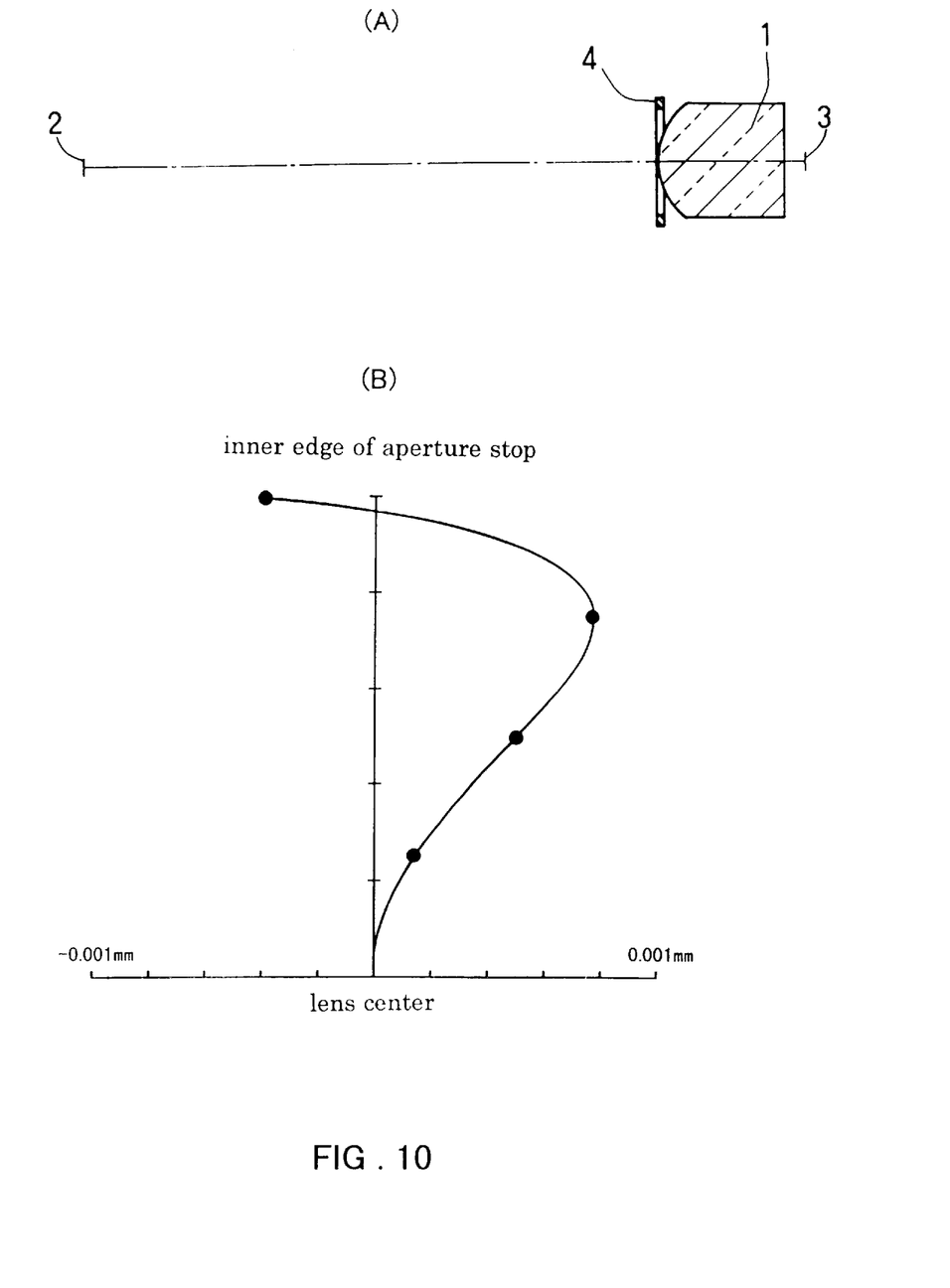
FIG. 10(A) is a cross-sectional diagram of Example 7 of an object lens system in accordance with the present invention.
FIG. 10(B) is a graph of the lateral spherical aberration of the object lens system in FIG. 10(A).
Figure 11:
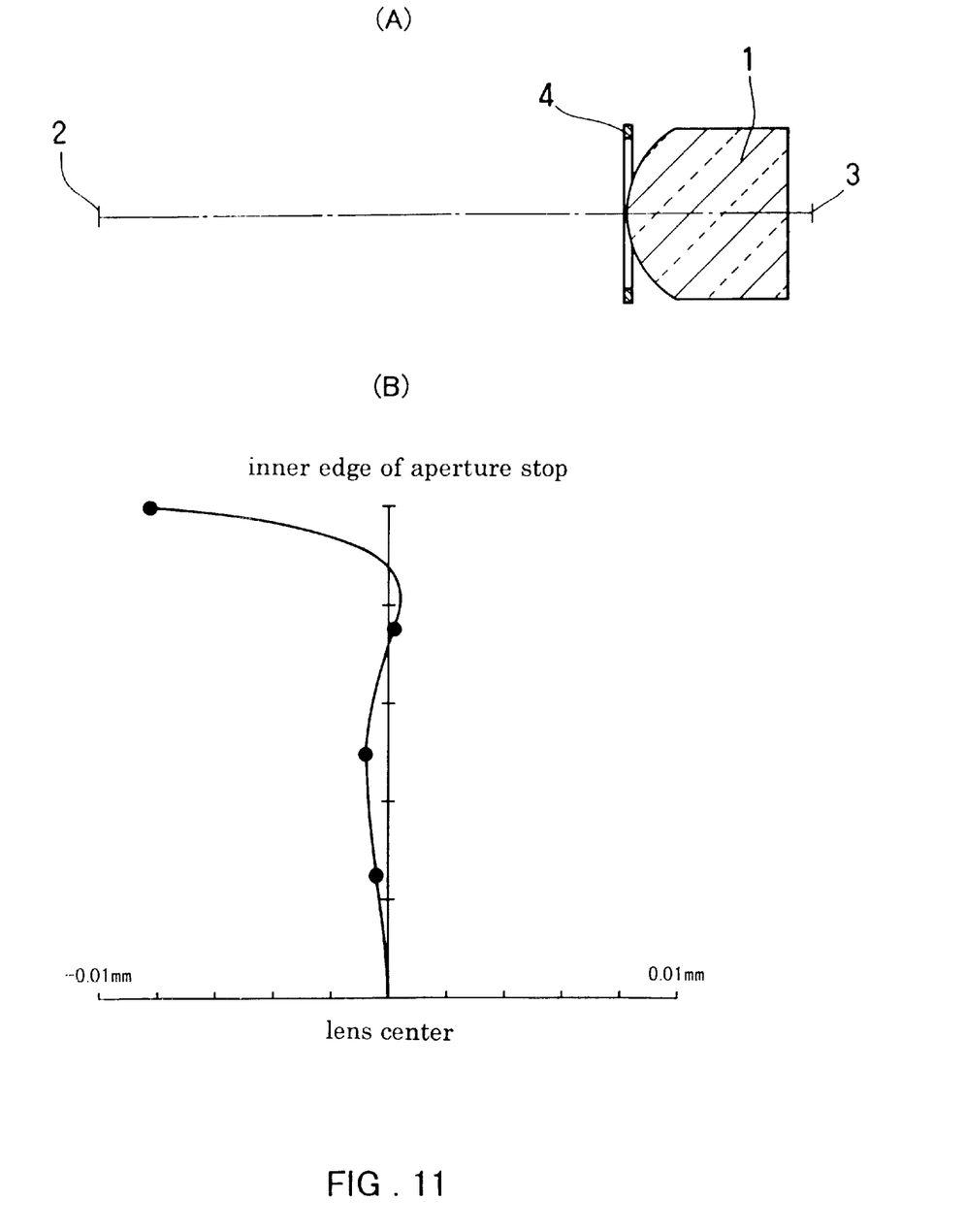
FIG. 11(A) is a cross-sectional diagram of Example 8 of an object lens system in accordance with the present invention.
FIG. 11(B) is a graph of the lateral spherical aberration of the object lens system in FIG. 11(A).

The refractive index n of the rod lens 1 has a distribution in the radial direction as shown in FIG. 3, which can be expressed by $$n(r)^2 = n_0^2 \cdot \{1 - (g \cdot r)^2 + h_4(g \cdot r)^4 + h_6(g \cdot r)^6 + h_8(g \cdot r)^8 + \ldots\} \quad \text{(Eq. 1)}$$

wherein r is the distance in the radial direction from the optical axis 1c of the rod lens 1, n(r) is the refractive index at the distance r in the radial direction from the optical axis 1c of the rod lens 1, $n_0$ is the refractive index on the optical axis 1c of the rod lens 1 (central refractive index), and g, $h_4$, $h_6$, $h_8$ etc. are the coefficients for the refractive index distribution.

An object lens system in accordance with this embodiment satisfies the equations $$1.0 \leq R/r_0 \leq 1.6 \quad \text{(Eq. 2)}$$

$$R/f \leq 1.2 \quad \text{(Eq. 3)}$$

wherein $r_0$ is the radius of the portion that functions as a lens measured from the optical axis 1c of the rod lens 1, that is, the radius of the effective lens portion of the rod lens 1, R is the curvature radius of the convex spherical surface 1a, and f is the focal length of the rod lens 1. The radius $r_0$ of the effective portion of the rod lens 1 can be defined, for example, as "the range where the RMS wave front aberration on the optical axis 1c is below 0.07λ". The radius $r_0$ of the effective portion of the rod lens 1 has an influence on the refractive power of the rod lens 1, and is one of the design parameters for the rod lens 1. In practical rod lenses 1, the refractive index distribution at a peripheral portion of the lens often deviates from the design value, so that this portion of the rod lens does not function well as a lens. For example, even when the actual outer diameter is 0.5 mm, if the effective lens diameter is actually 0.4 mm, then $r_0$ is 0.2 mm.

It is preferable that the radius $r_0$ of the effective lens portion of the rod lens 1 is 0.05 mm $\leq r_0 \leq 0.20$ mm. If the radius $r_0$ of the effective lens portion of the rod lens 1 is less than 0.05, then manufacturing of the rod lens 1 and the polishing of the convex spherical surface 1a becomes difficult. If the radius $r_0$ is more than 0.20, the object lens system cannot be miniaturized.

Moreover, it is even more preferable that the radius $r_0$ of the effective lens portion of the rod lens 1 is 0.10 mm $\leq r_0 \leq$ 0.15 mm, most preferably about 0.125 mm.

If the surface of this rod lens 1 on the side of the object plane 2 is a convex spherical surface 1a and the equations (Eq. 2) and (Eq. 3) are satisfied, the refractive power of the entire lens is increased, so that the NA on the image side can be increased. As a result, this rod lens 1 can increase the recording density of a recording medium, if the convex spherical surface 1a faces the light source and the planar surface 1b faces the recording medium in the optical head. Moreover, this object lens system is made of a single graded index lens (rod lens 1), keeping the number of parts to a minimum, which allows a smaller and lighter device, so that faster access can be accomplished.

The realizable value for the refractive index $n_0$ on the optical axis 1c of the rod lens (central refractive index) depends on the rod lens material (glass or plastic), and is in the range of $1.40 \leq n_0 \leq 1.80$.

The brightness of the rod lens 1 is governed by the aperture angle, which indicates the range over which the lens accepts light. The aperture angle $\theta$ (°) can be expressed by $$\theta = (n_0 \cdot g \cdot r_0)/(\pi/180) \quad \text{(Eq. 4)}$$

It is preferable that the product $n_0 \cdot g \cdot r_0$ is in the range of $0.45 \leq n_0 \cdot g \cdot r_0 \leq 0.71$. If $n_0 \cdot g \cdot r_0$ is less than 0.45, the NA cannot be increased (the lens cannot be made brighter) and if $n_0 \cdot g \cdot r_0$ exceeds 0.71, it is difficult to manufacture the rod lens for example by ion exchange.

Using a rod lens 1 with a refractive index distribution expressed by Eq. 1, spherical aberration of the entire object lens system can be corrected through the refractive index distribution coefficients $h_4$, $h_6$, $h_8$, etc. If, for reasons of simplicity, $h_6$ and higher terms are set to zero, and the refractive index distribution of the rod lens 1 is approximately $$n(r)^2 = n_0^2 \cdot \{1 - (g \cdot r)^2 + h_4 (g \cdot r)^4\} \quad \text{(Eq. 5)}$$

then it is preferable that the refractive index distribution coefficient $h_4$ is in the range of $-1.5 \leq h_4 \leq 2.5$, because it is very difficult to manufacture a rod lens 1 having a refractive index distribution outside this range. Moreover, even when $h_6$ and higher terms are included, spherical aberration can be corrected if $h_4$ is within this range.

If $L_2/r_0$, wherein $L_2$ is the distance between the planar surface 1b of the rod lens 1 and the image plane 3, satisfies $$L_2/r_0 \leq 0.37 \quad \text{(Eq. 6)}$$

the spherical aberration of the entire object lens system can be corrected easily. $L_2$ is also referred to as the "working distance".

An object lens system having this configuration is mounted in an optical head so that, for example, the convex spherical surface 1a of the rod lens 1 faces the light source, and the planar surface 1b faces the recording medium. Because the diameter of the rod lens 1 is extremely small, and the distance $L_2$ between planar surface 1b and the image plane 3 is very small, the object lens system can be mounted in the optical head in a position where it is very close to the recording medium.

It is assumed that a monochromatic light source such as a laser is used for the light source. It is preferable that the wavelength $\lambda$ of this light source is 0.3 µm–2.0 µm. For wavelengths $\lambda$ of less than 0.3 µm, the transmittivity of the rod lens 1 typically reduces, and if the wavelength $\lambda$ is more than 2.0 µm, the spot diameter at the focus becomes large and the recording density of the recording medium decreases.

Moreover, assuming that an optical fiber with an NA of about 0.05–0.2 is used for the light source, it is preferable that the object lens system is used as a finite system, where the distance $L_1$ between the object plane 2 and the convex spherical surface 1a of the rod lens 1 satisfies the condition $5 \leq L_1 r_0 \leq 20$. If a single mode fiber is used for the light source, it is more preferable that the condition $8 \leq L_1/r_0 \leq 12$ is satisfied, because then the NA is about 0.1. By using the rod lens 1 in such a finite system satisfying these conditions, the widening of the light beam from the light source can be matched to the diameter of the rod lens 1, and the loss of light energy can be kept low. However, if parallel light is used for the light source, the system can also be designed as an infinite system wherein the distance $L_1$ between the object plane 2 and the convex spherical surface 1a of the rod lens 1 is infinite.

Table 1 lists specific examples.

Figure 12:
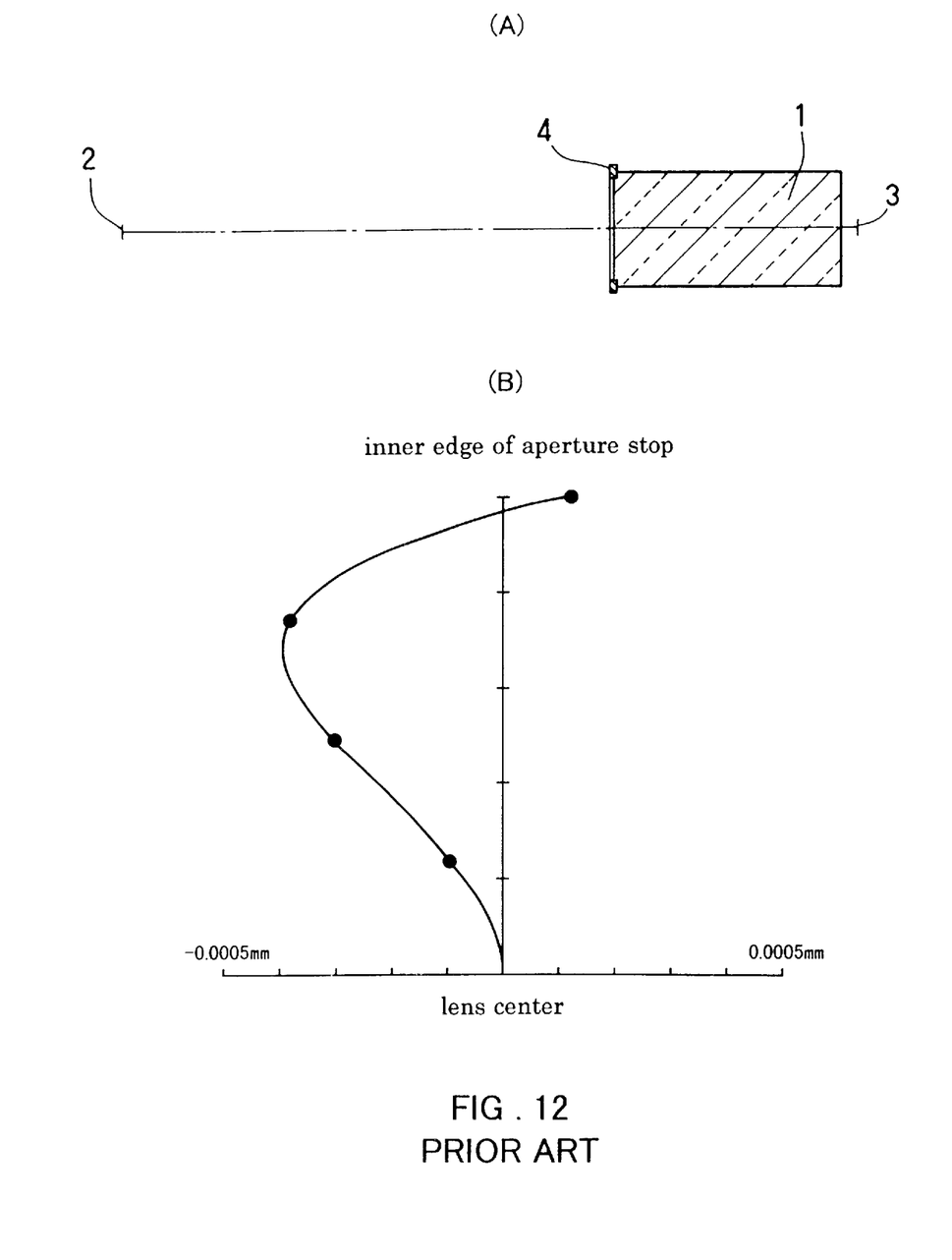
FIG. 12(A) is a cross-sectional diagram of the Comparative Example of an object lens system in accordance with the present invention.
FIG. 12(B) is a graph of the lateral spherical aberration of the object lens system in FIG. 12(A).

FIGS. 4 to 11 correspond to the Examples 1 to 8 in Table 1, whereas FIG. 12 corresponds to the Comparative Example in Table 1. Each of those diagrams shows (A) the configuration of the object lens system, and (B) its lateral spherical aberration. In the diagrams (A) of the object lens system, numeral 1 denotes the rod lens, numeral 2 denotes the object plane, numeral 3 denotes the image plane, and numeral 4 denotes the aperture stop. In the diagrams (B) of the lateral spherical aberration, the end of the vertical axis indicates the inner edge of the aperture stop 4.

As can be seen from Table 1 and the FIGS. 4 to 12, the NA on the image side is 0.556 in the case of a simple rod lens wherein both lens surfaces are planar surfaces (Comparative Example), whereas with the Examples 1 to 8, a large value of at least 0.6 can be attained for the NA on the image side, and the spherical aberration can be corrected. Especially with lens design parameters as in the Examples 1 to 3, an especially preferable result of at least 0.7 NA on the image side can be attained. However, when the curvature radius R of the convex plane 1a becomes very small as in Example 8, a correction of the spherical aberration by adjusting only the refractive index distribution coefficient $h_4$ is difficult, and it is necessary to set the refractive index distribution coefficient $h_6$ to an appropriate value as well.

In the present embodiment, an aperture stop 4 is provided at the vertex of the convex spherical surface 1a of the rod lens 1. However, since in the present invention only the paraxial image is used, the aperture stop 4 in an actual product can be provided by an integrated frame portion such as a lens holder.

Furthermore, in the present embodiment, a rod lens 1 has been given as an example for a graded index lens, however, the present invention is not limited to this rod lens 1, and can be any transparent medium having a refractive index distribution in the radial direction, which has a convex spherical surface on one side and a planar surface on the other side.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

TABLE 1

| | Ex. 1 | Ex. 2 | Ex. 3 | Ex. 4 | Ex. 5 | Ex. 6 | Ex. 7 | Ex. 8 | Comp. Ex. |
|---|---|---|---|---|---|---|---|---|---|
| distance $L_1$(mm) between object and Lens | 1.100 | 2.000 | 0.800 | ∞ | 2.000 | 1.000 | 1.500 | 0.800 | 1.100 |
| radius of aperture stop (mm) | 0.115 | 0.120 | 0.110 | 0.195 | 0.095 | 0.048 | 0.140 | 0.113 | 0.115 |
| lens radius $r_0$ (mm) | 0.125 | 0.125 | 0.125 | 0.200 | 0.100 | 0.050 | 0.150 | 0.125 | 0.125 |
| object-side curvature radius R (mm) | 0.160 | 0.180 | 0.150 | 0.260 | 0.160 | 0.075 | 0.200 | 0.140 | ∞ |
| refractive index $n_0$ on the optical axis | 1.682 | 1.682 | 1.700 | 1.400 | 1.800 | 1.650 | 1.550 | 1.600 | 1.700 |
| refractive index distribution coeff. g (mm$^{-1}$) | 3.05 | 3.05 | 3.30 | 2.07 | 2.51 | 6.67 | 2.80 | 3.50 | 3.00 |
| refractive index distribution coefficient $h_4$ | +1.56 | +0.44 | +2.26 | −1.42 | +2.00 | +0.43 | +0.01 | 0 | +0.65 |
| refractive index distribution coefficient $h_6$ | 0 | 0 | 0 | 0 | 0 | 0 | 0 | +9.3 | 0 |
| lens thickness $Z_0$ (mm) | 0.270 | 0.262 | 0.235 | 0.484 | 0.296 | 0.120 | 0.325 | 0.244 | 0.515 |
| distance $L_2$(mm) betw. lens and image surf. | 0.0331 | 0.0398 | 0.0453 | 0.0280 | 0.00984 | 0.0148 | 0.0499 | 0.0400 | 0.0402 |
| effective focal length f(mm) | 0.1501 | 0.1583 | 0.1377 | 0.3058 | 0.1484 | 0.0718 | 0.1955 | 0.1421 | 0.1961 |
| NA (image side) | 0.717 | 0.711 | 0.719 | 0.673 | 0.618 | 0.642 | 0.671 | 0.768 | 0.556 |
| $n_0 \cdot g \cdot r_0$ | 0.641 | 0.641 | 0.701 | 0.580 | 0.452 | 0.550 | 0.651 | 0.700 | 0.638 |
| $R/r_0$ | 1.28 | 1.44 | 1.20 | 1.30 | 1.60 | 1.50 | 1.33 | 1.12 | — |
| $L_1/r_0$ | 8.8 | 16.0 | 6.4 | — | 20.0 | 20.0 | 10.0 | 6.4 | 8.8 |
| $L_2/r_0$ | 0.2648 | 0.3184 | 0.3624 | 0.14 | 0.0984 | 0.296 | 0.3327 | 0.32 | 0.3216 |
| R/f | 1.066 | 1.1371 | 1.089 | 0.8502 | 1.0782 | 1.0446 | 1.023 | 0.9852 | — |

What is claimed is:

1. An object lens system comprising a lens made of a transparent medium with a refractive index distribution in a radial direction, wherein a first surface of the lens is a convex spherical surface, and a second surface of the lens is a planar surface;

the lens is arranged so that the convex spherical surface faces an object surface, and the planar surface faces an image surface;

the equations $$1.0 \leq R/r_0 \leq 1.6, \text{ and}$$

$$R/f \leq 1.2$$

are satisfied, wherein $r_0$ is a radius of a portion of the lens that operates as a lens, measured from an optical axis of the lens, R is a curvature radius of the convex spherical surface, and f is a focal length of the lens;

the lens is a rod lens, whose refractive index distribution is expressed by $$n(r)^2 = n_0^2 \cdot \{1 - (g \cdot r)^2 + h_4(g \cdot r)^4 + h_6(g \cdot r)^6 + h_8(g \cdot r)^8 + \ldots\}$$

wherein r is a distance in a radial direction from the optical axis of the rod lens, $n_0$ is a refractive index on the optical axis of the rod lens, and g, $h_4$, $h_6$, $h_8$, etc. are refractive index distribution coefficients; and $L_2/r_0$ is in a range of $L_2/r_0 \leq 0.37$, wherein $L_2$ is a distance between the planar surface of the lens and the image surface.

2. The object lens system of claim 1, wherein the radius $r_0$ is in a range of 0.05 mm $\leq r_0 \leq$ 0.20 mm.

3. The object lens system of claim 1, mounted in an optical head, so that the convex spherical surface of the lens faces a light source, and the planar surface of the lens faces a recording medium.

4. The object lens system of claim 1, wherein the refractive index $n_0$ on the optical axis of the rod lens is in a range of $1.40 \leq n_0 \leq 1.80$.

5. The object lens system of claim 1, wherein a product $n_0 \cdot g \cdot r_0$ is in a range of $0.45 \leq n_0 \cdot g \cdot r_0 \leq 0.71$.

6. The object lens system according to claim 1, wherein the refractive index distribution coefficient $h_4$ is in a range of $-1.5 \leq_4 \leq 2.5$.

7. The object lens system according to claim 1, wherein $L_1 r_0$ is in a range of $5 \leq L_1/r_0 \leq 20$, wherein $L_1$ is a distance between the object surface and the convex spherical surface of the lens.

8. The object lens system according to claim 1, wherein a distance $L_1$ between the object surface and the convex spherical surface of the lens is infinite.

* * * * *